(12) United States Patent
Docherty

(10) Patent No.: US 6,322,896 B1
(45) Date of Patent: Nov. 27, 2001

(54) DECORATIONS COMPOSED OF POLYPROPYLENE

(76) Inventor: Edward Docherty, 13700 Sutton Park Dr. South Suite 436, Jacksonville, FL (US) 32224

( * ) Notice: Subject to any disclaimer, the term of this patent is extended or adjusted under 35 U.S.C. 154(b) by 0 days.

(21) Appl. No.: 09/742,265

(22) Filed: Dec. 20, 2000

Related U.S. Application Data

(60) Provisional application No. 60/171,438, filed on Dec. 22, 1999.

(51) Int. Cl.[7] .................................................. B32B 15/08
(52) U.S. Cl. .................. 428/461; 428/4; 428/7; 428/9; 428/12; 428/18; 428/209; 428/457; 428/458; 428/461; 428/542.2; 428/542.6
(58) Field of Search .................. 428/18, 4, 7, 9, 428/12, 209, 457, 337, 458, 542.6, 542.2, 195, 461

(56) References Cited

U.S. PATENT DOCUMENTS

| | | | |
|---|---|---|---|
| 4,609,576 | * | 9/1986 | Liu .......................................... 428/18 |
| 5,899,144 | * | 5/1999 | Parks ..................................... 101/129 |
| 5,922,455 | * | 7/1999 | Stepanek ............................... 428/332 |

* cited by examiner

Primary Examiner—Deborah Jones
Assistant Examiner—Abraham Bahta
(74) Attorney, Agent, or Firm—Thomas C. Saitta

(57) ABSTRACT

Artificial icicles, artificial Christmas trees, garlands, ribbons and the like composed of non-flammable polypropylene film.

12 Claims, 1 Drawing Sheet

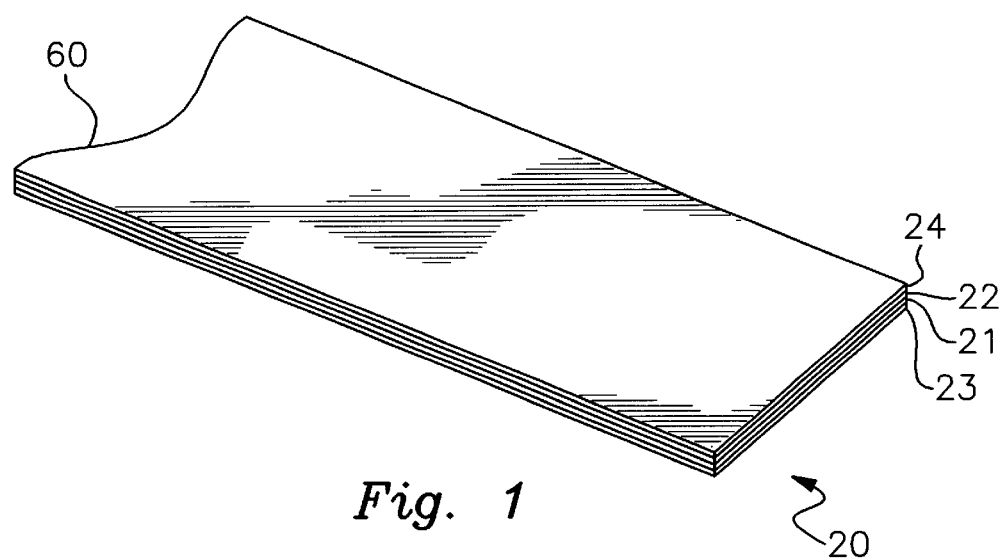
Fig. 1
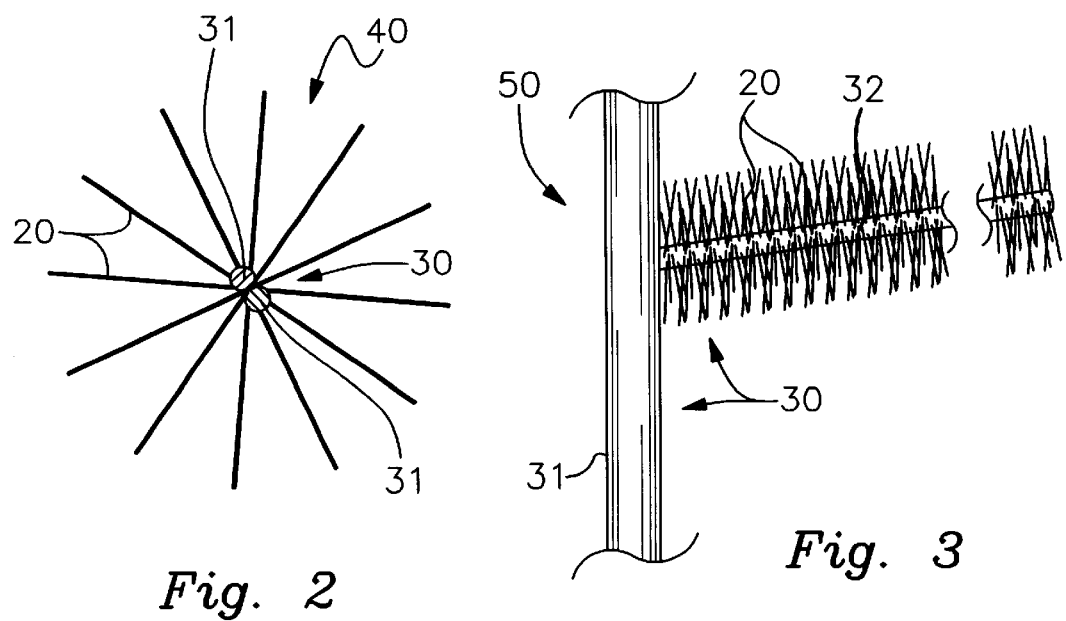
Fig. 2
Fig. 3

DECORATIONS COMPOSED OF POLYPROPYLENE

This application claims the benefit of U.S. Provisional Patent Application Ser. No. 60/171,438, filed Dec. 22, 1999.

BACKGROUND OF THE INVENTION

This invention relates generally to the field of decorative elements made of thin film or sheet polymers, and in particular to such decorations such as garlands, ribbons, artificial icicles and artificial Christmas trees where environmental considerations and flammability concerns are important.

Many decorative elements used for holiday celebrations and other special occasions are made from strips of thin plastic film (typically 0.5 to 1.5 mils), either alone or in combination with wire or other support means. Often the film is colored or metallized by adding additional layers to the plastic film create a foil with enhanced reflective properties. Examples of such decorations include artificial icicles (long narrow strips of thin silver-colored foil which are draped onto Christmas trees), garlands (short narrow strips of thin foil or colored plastic entwined with interlocking wires to create an elongated decorative device which is draped onto or encircling Christmas trees or other base articles), ribbons (long medium-width strips of thin foil or colored plastic used to encircle items), and artificial Christmas trees (decorative objects simulating a tree and having short narrow strips of thin, green or other-colored, plastic or foil mounted onto branch-like projections extending from a trunk-like central member).

It is the most common current practice to make these decorative elements from a polyvinyl chloride (PVC) polymer. PVC is typically produced by an oxyhydrochlorination process. The electrolysis of brine provides chlorine and caustic soda, and the chlorine is reacted with ethylene to produce ethylene dichloride, which is dehydrohalongenated to yield vinyl chloride monomer. Approximately 9.8 billion pounds are produced annually, with most commercial PVC made up of homopolymers and a small amount of copolymers. It has a high blending capability with plasticizers, stabilizers and other additives.

Unfortunately, PVC suffers from serious drawbacks with regard to health and the environment. Many credible studies have shown that exposure to PVC causes a number of medical conditions and diseases, including numbing/poor circulation in the fingers, and severe damage or cancer of the liver, lungs, skin and blood. This is mainly due to the use of pthalates as an additive to soften the PVC. The pthalates leach from the PVC rather easily over time and exposure. Companies such as Visa, Nike, Lego, Brio, Mattel and Toys-R-Us have announced severe restrictions or outright bans on production of certain toys and other items from PVC. The international environmental protection organization Greenpeace continues to promote a call for a total ban on the use of PVC in production.

Furthermore, while PVC is considered flame-resistant, since it does not ignite until a temperature of about 1500 degrees C. is reached, it does present problems in situations likely to be encountered in the home. PVC will not ignite at low temperatures, but PVC film such as used in holiday decorations will char when contacted by a flame. This charring releases toxic gases and smoke into the air.

It is an object of this invention to provide decorative elements composed of an environmentally safe and non-carcinogenic polymer, to wit, polypropylene (PP), of the type which is designated as non-flammable under the standards of the Federal Hazardous Substance Act, which can be formed into thin films of a transparent, colored or metallized nature. The thin film PP is formed into decorative elements such as artificial icicles, artificial Christmas trees, garlands, ribbons, etc.

SUMMARY OF THE INVENTION

The invention comprises decorative elements composed entirely of thin film plastic or composed of thin film plastic and support elements, structured to create artificial icicles, artificial Christmas trees, garlands, ribbons and the like, where the polymer used in construction is polypropylene due to its beneficial environmental characteristics. The polypropylene is of the type which is considered non-flammable under 16 CFR 1500.44 of the Federal Hazardous Substances Act. The decorative elements typically range in thickness from about 0.5 mil up to 5 mil, with the thicker films being less susceptible to undesired crimping or creasing. The film may be metallized for aesthetics and combined with other film layers or components.

BRIEF DESCRIPTION OF THE DRAWINGS

FIG. 1 is a side view of a polypropylene film having a core layer, a metal adhesion layer, a metal foil layer and a skin layer.

FIG. 2 is an end view of a garland.

FIG. 3 is partial view of an artificial Christmas tree showing the vertical and horizontal support members.

DETAILED DESCRIPTION OF THE INVENTION

The invention comprises in general decorative elements, which include but are not limited to artificial icicles 60, artificial Christmas trees 50, garlands 40, ribbons and the like, where the decorative elements are composed primarily or substantially of polypropylene (PP) polymer film material 20. The PP material is present in thin film form, typically approximately 0.5 to 5 mils in thickness, depending on the desired physical and structural properties, and is presented in relatively narrow elongated form, such that the overall length is greater than the width, and very much greater than the thickness. The PP film 20 may be transparent, opaque, colored or metallized by adding layers to create a reflective foil.

PP is universally recognized as an environmentally safe material, and does not present any of the problems associated with PVC, especially in regard to the health and cancer hazards. It is non-irritating, non-carcinogenic, non-mutagenic, with no oral, dermal or inhalatory problems. It is also a more economical product. PP differs from the simple polymer ethylene through the mere addition of a methyl group attached to every other carbon atom, thus stiffening the polymer chain. PP's stiffer chain gives it a higher melting temperature and tensile strength, with a melting point for the homopolymer at about 330 degrees F. PP is very easily tailored for specific applications. It has a high heat of combustion, making it ideal for applications near light bulbs.

PP is synthesized by placing propylene monomer under controlled conditions of heat and pressure in the presence of organo-metallic, stereospecific catalysts of the Ziegler-Natta type. Stereochemcial configurations of either isotactic, syndiotactic or atatic may be achieved. Vapor-phase and slurry processing are mainly used. Molecular weight, molecular weight distribution, stereospecificity and additives influence the physical and processing properties of PP. Stabilization packages, antioxidants, ultraviolet inhibitors and other additives are usually incorporated during processing.

In general PP film is considered non-flammable, however certain PP films containing additives may be flammable. PP film suitable for use in the invention therefore, is of the type which is defined as non-flammable under the testing procedure of 16 CFR 1500.44 of the Federal Hazardous Substances Act, such that it does not ignite and burn at a rate greater than 0.1 inches along its major axis.

For artificial icicles 60, the PP thin film 20 is presented as having a metallized foil layer 24 which is very narrow relative to its length. There is no added support structure, the icicles 60 being draped onto other objects, such as the branches of a Christmas tree. Thin films in the range of 0.5 to 1.5 mil in thickness are suitable for this application. For garlands 40, the PP film 20 may be of any color or foil presentation, and comprises lengths not as exaggerated relative to width as for the icicles 60, but again having a relatively narrow width. The strips of PP film 20 are entwined amongst or otherwise attached to transversely extending support members 30, such as intertwined wires 31, such that the PP strips 20 extend generally perpendicularly in all directions from the support means 30. Because it is desired that the PP thin film strips 20 extend in all directions, the film 20 must be relatively stiff to counter gravity effects, and therefore film thicknesses of up to about 5 mil may be utilized for this application. The support means 30 maintain the physical position and orientation of the individual PP strips 20 relative to each other, and the strips 20 are oriented in different directions to give the garland 40 a cylindrical appearance. Ribbons are formed of long narrow strips 20 of PP, with the width to length ration not as extreme as for the icicles 60 or garland 40. As with garlands 40, any color or foil may be utilized. The film 20 thickness is chosen based on the desired degree of stiffness of the ribbon. For artificial Christmas trees 50, support means 30 comprising a vertical member 33 to simulate a trunk and generally horizontal members 32 extending radially from the vertical member 33 to simulate branches are provided. Green-colored PP, or any other color or foil if design considerations are to take precedent over simulated authenticity, are provided in a configuration which will approximate the configuration of natural pine needles. The PP strips 20, relatively narrow and short, are attached to the branch-like support elements 32 by entwining or any other suitable fastening means, including adhesive. Stiffness is of paramount importance in this application, so thicker films of up to about 5 mil will be utilized.

A suitable polypropylene film 20 for use in the applications described above, for example, is a biaxially oriented PP film 20 which comprises a PP core layer 21 having on one side a metal adhesion layer 22 for attachment of a decorative metal foil layer 24 and on the other side a skin layer 23 which is non-heatsealable, such as a multilayer PP film sold under the brand POLIBAK. This film composition provides for good metal adhesion if desired, is dimensionally stable in changing climatic conditions, is superior in handling during vacuum metallization processing and has very good overall machinability. For the thicker films, cast PP film may be utilized.

It is understood that certain equivalents and substitutions for elements set forth above may be obvious to those skilled in the art, and thus the true scope and definition of the invention is to be as set forth in the following claims.

I claim:

1. A decorative element adapted for use as an artificial icicle or ribbon and comprising a thin, non-flammable, polypropylene film, where the film is provided as an elongated narrow strip with a thickness in the range of about 0.5 mil to 5 mil, where the thickness is chosen dependent on the desired stiffness of the strip, where said film comprises a polypropylene core layer, a metal adhesion layer joined to said core layer, and a non-heatsealable polymer skin layer joined to said core layer.

2. The decorative element of claim 1, further comprising a metal foil layer joined to said metal adhesion layer.

3. A decorative element comprising a plural number of thin, elongated, narrow, non-flammable, polypropylene strips and elongated support means for said strips, where said support means maintain the physical position and orientation of each of said strips relative to each other, where said support means comprise intertwined wires and said strips extend generally perpendicularly from said wires, and where said strips comprise a polypropylene core layer, a metal adhesion layer joined to said core layer, and a non-heatsealable polymer skin layer joined to said core layer.

4. The decorative element of claim 3, further comprising a metal foil layer joined to said metal adhesion layer.

5. A decorative element simulating a Christmas tree, said decorative element comprising a vertical support member to simulate a tree trunk, multiple generally horizontal support members extending from said vertical support member to simulate tree branches, and a plural number of thin, elongated, narrow, non-flammable, polypropylene strips attached to said horizontal support members, where said strip comprises a polypropylene core layer, a metal adhesion layer joined to said core layer, and a non-heatsealable polymer skin layer joined to said core layer.

6. The decorative element of claim 5, further comprising a metal foil layer joined to said metal adhesion layer.

7. The decorative element of claim 1, wherein said non-heatsealable polymer skin layer comprises a polypropylene.

8. The decorative element of claim 3, wherein said non-heatsealable polymer skin layer comprises a polypropylene.

9. The decorative element of claim 5, wherein said non-heatsealable polymer skin layer comprises a polypropylene.

10. The decorative element of claim 1, wherein said polypropylene core layer is biaxially oriented.

11. The decorative element of claim 3, wherein said polypropylene core layer is biaxially oriented.

12. The decorative element of claim 5, wherein said polypropylene core layer is biaxially oriented.

* * * * *